US012730808B2

(12) United States Patent
Kim et al.

(10) Patent No.: US 12,730,808 B2
(45) Date of Patent: Sep. 8, 2026

(54) TABLE-VALUED PARAMETER FOR CALL STATEMENT

(71) Applicant: SAP SE, Walldorf (DE)

(72) Inventors: Daeho Kim, Yongin (KR); Hyojin Ha, Seoul (KR); Hyung Jo Yoon, Yongin (KR); Kyungwook Ko, Seongnam (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/884,623

(22) Filed: Sep. 13, 2024

(65) Prior Publication Data

US 2026/0079935 A1 Mar. 19, 2026

(51) Int. Cl.
*G06F 16/2453* (2019.01)
*G06F 16/22* (2019.01)
*G06F 16/242* (2019.01)

(52) U.S. Cl.
CPC .... *G06F 16/24542* (2019.01); *G06F 16/2282* (2019.01); *G06F 16/2443* (2019.01)

(58) Field of Classification Search
CPC ............. G06F 16/2445; G06F 16/2443; G06F 16/2282
USPC .......................................................... 707/702
See application file for complete search history.

(56) References Cited

U.S. PATENT DOCUMENTS 6,163,781 A * 12/2000 Wess, Jr. ................ G06Q 40/08 715/236
11,256,684 B1 * 2/2022 Papakonstantinou ........................ G06F 16/2445
2003/0167277 A1 * 9/2003 Hejlsberg .................. G06F 9/46 707/999.102
2019/0324952 A1 * 10/2019 Ying ....................... G06F 16/21
2023/0244652 A1 * 8/2023 Susairaj ................ G06F 16/245 707/703
2025/0185352 A1 * 6/2025 Zou ...................... H10D 62/151

* cited by examiner

*Primary Examiner* — Hung T Vy
(74) *Attorney, Agent, or Firm* — Mintz Levin Cohn Ferris Glovsky and Popeo, P.C.

(57) ABSTRACT

In some embodiments, there is provided a computer-implemented method including receiving a call to a stored procedure that includes a first table value parameter corresponding to a first external table and a second table value parameter corresponding to a second external table; and passing, to the called stored procedure, a first bit stream of parameters from the first external table passed using the first table value parameter and a second bit stream of parameters from the second external table passed using the second table value parameter. Related systems, methods, and articles of manufacture are also disclosed.

8 Claims, 9 Drawing Sheets

Figure 3A:
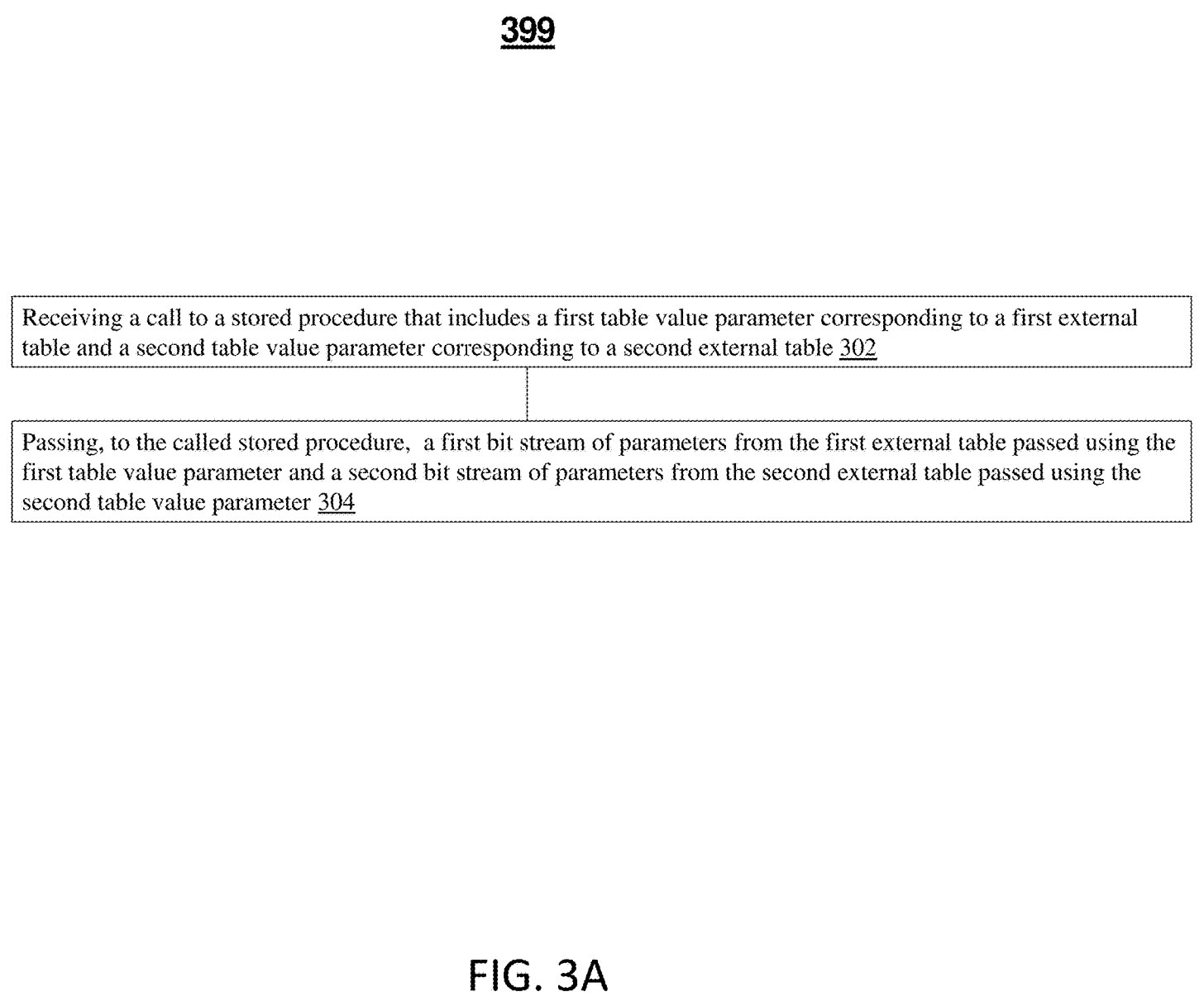

399

Receiving a call to a stored procedure that includes a first table value parameter corresponding to a first external table and a second table value parameter corresponding to a second external table 302

Passing, to the called stored procedure, a first bit stream of parameters from the first external table passed using the first table value parameter and a second bit stream of parameters from the second external table passed using the second table value parameter 304

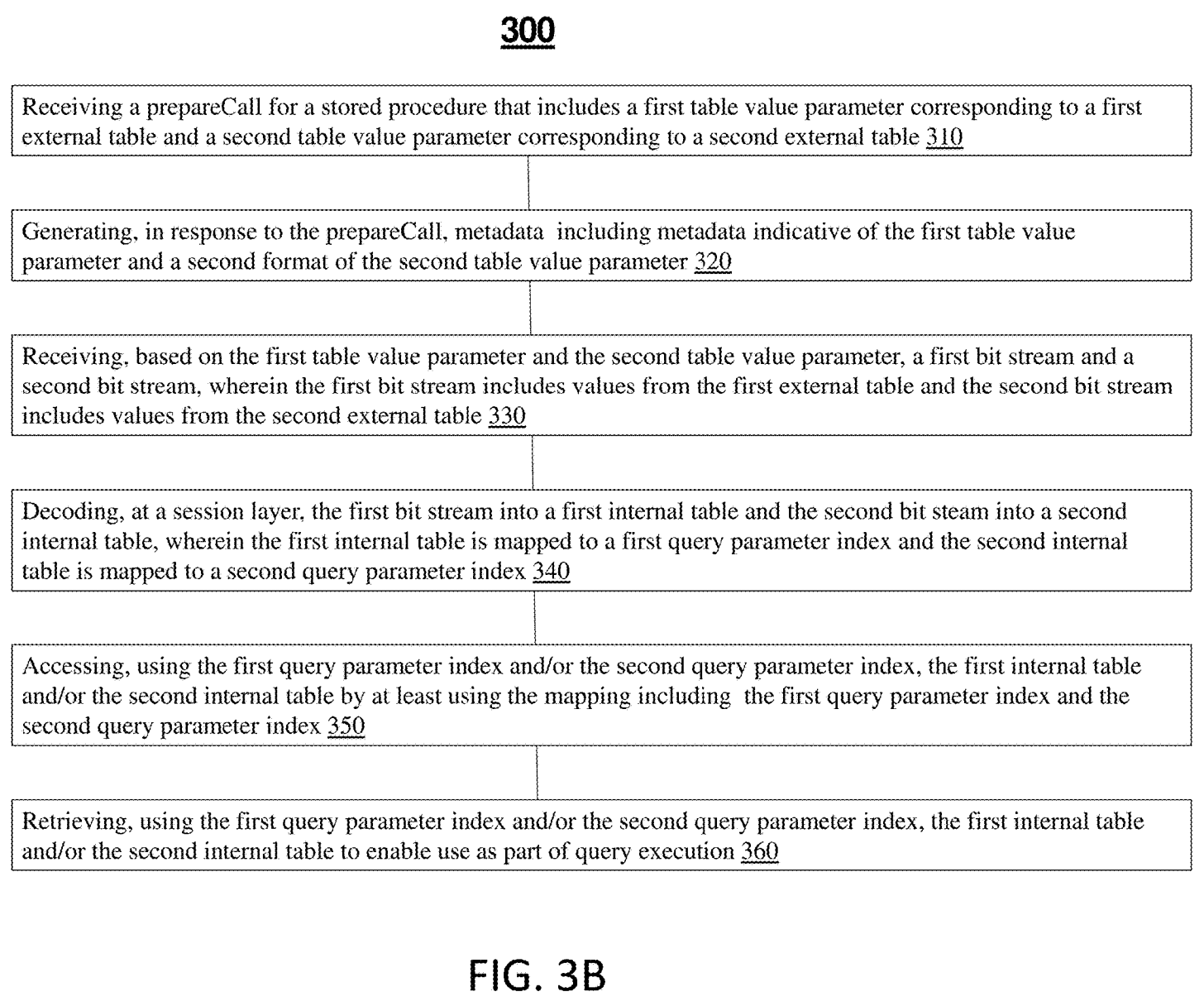

Receiving a prepareCall for a stored procedure that includes a first table value parameter corresponding to a first external table and a second table value parameter corresponding to a second external table 310

Generating, in response to the prepareCall, metadata including metadata indicative of the first table value parameter and a second format of the second table value parameter 320

Receiving, based on the first table value parameter and the second table value parameter, a first bit stream and a second bit stream, wherein the first bit stream includes values from the first external table and the second bit stream includes values from the second external table 330

Decoding, at a session layer, the first bit stream into a first internal table and the second bit steam into a second internal table, wherein the first internal table is mapped to a first query parameter index and the second internal table is mapped to a second query parameter index 340

Accessing, using the first query parameter index and/or the second query parameter index, the first internal table and/or the second internal table by at least using the mapping including the first query parameter index and the second query parameter index 350

Retrieving, using the first query parameter index and/or the second query parameter index, the first internal table and/or the second internal table to enable use as part of query execution 360

FIG. 3B

TABLE-VALUED PARAMETER FOR CALL STATEMENT

TECHNICAL FIELD

The subject matter described herein relates generally to optimizing database execution.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

In some embodiments, there is provided a computer-implemented method including receiving a call to a stored procedure that includes a first table value parameter corresponding to a first external table and a second table value parameter corresponding to a second external table; and passing, to the called stored procedure, a first bit stream of parameters from the first external table passed using the first table value parameter and a second bit stream of parameters from the second external table passed using the second table value parameter. Related systems, methods, and articles of manufacture are also disclosed.

In some implementations, the current subject matter includes one or more of the following optional features. The method may further include receiving a prepare call for the stored procedure that includes the first table value parameter corresponding to the first external table and the second table value parameter corresponding to the second external table. The method may further include generating, in response to the prepare call, metadata including metadata indicative of a first format of the first table value parameter and a second format of the second table value parameter. The method may further include receiving, based on the first table value parameter and the second table value parameter, the first bit stream and the second bit stream. The method may further include decoding, at a session layer, the first bit stream into a first internal table and the second bit stream into a second internal table, wherein the first internal table is mapped to a first query parameter index and the second internal table is mapped to a second query parameter index. The method may further include accessing, using the first query parameter index and/or the second query parameter index, the first internal table and/or the second internal table by at least using the mapping including the first query parameter index and the second query parameter index. The method may further include retrieving, using the first query parameter index and/or the second query parameter index, the first internal table and/or the second internal table to enable use as part of query execution.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3A and 3B depict examples of a process for a call procedure to directly consume external tabular data, in accordance with some embodiments.

When practical, similar reference numbers denote similar structures, features, or elements.

DETAILED DESCRIPTION

In some database management systems, external tabular data may not be directly used as an input argument for a call procedure's table parameter. Due to the issues with handling external tabular data, additional operations may be used to store and consume the external tabular data. For example, the external tabular data may be inserted into a temporary table (which consumes additional database processor and memory resources) and that temporary table may then be used as the called procedure's input. Table 1 below depicts an example of the temporary table creation, wherein the MYTAB is the temporary table into which the external tabular data (e.g., "insert ABAP Itab values") is inserted. After the external table data is inserted into the MYTAB, it can be called as an input into the CALL statement's procedure, which in this example calls the stored procedure MYPROC.

TABLE 1

```
CREATE TABLE MYTAB (..);
INSERT INTO MYTAB VALUES (..); -- insert ABAP Itab values
...
INSERT INTO MYTAB VALUES (..); -- insert ABAP Itab values
CALL MYPROC (MYTAB);
```

Figure 1A:
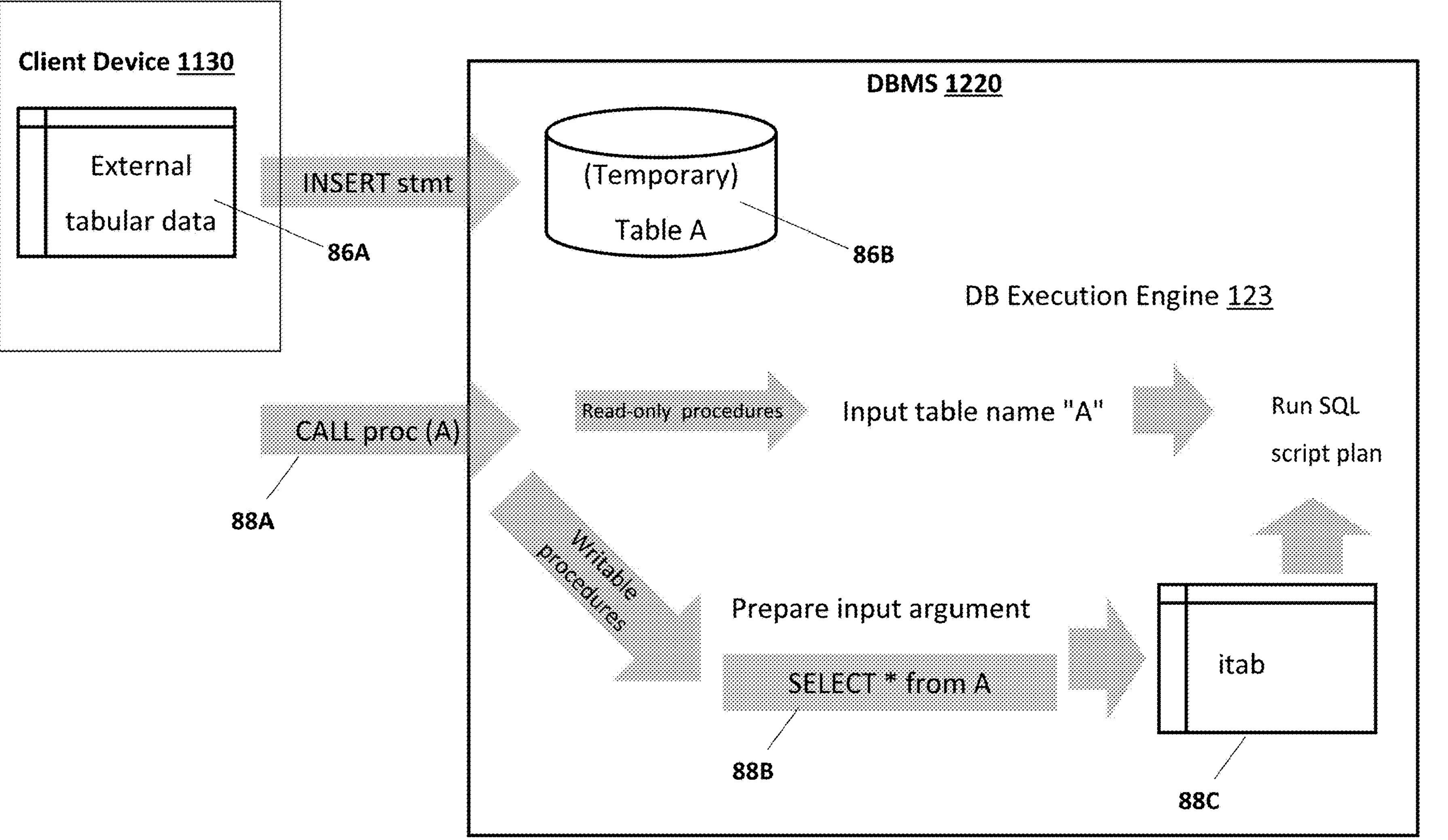
FIG. 1A depicts an example of a system including a client device and a database management system including a temporary table for inserting external tabular data, in accordance with some example embodiments.

FIG. 1A depicts an example of a system including a client device 1130 and a database management system 1220 (DBMS), in accordance with some example embodiments. Referring to the example of FIG. 1A and Table 1, the external tabular data 86A is inserted using an insert statement (also referred to as an insert operation) into a temporary table 86B created in the working memory of the database management system 1220. Later, the call procedure 88A cannot directly call the external tabular data 86A, so the CALL statement 88A consumes Table A 86B as CALL PROC(A). The internal table (itab) refers to tabular data stored in one or more columns (or in another form, such as line-by-line in the case of rows) in the database management system's working memory. For example, an internal table (itab) may be used to store data from a database table or an intermediate result during query processing within a program. The example described with respect to FIG. 1A shows the additional resource usage (e.g., in terms of processor usage and memory usage) needed to create the temporary table 86B that serves as an input for the call procedure 88A.

In some embodiments, there is provided a way for a query operation, such as the procedure call statement, select statement, and the like, to directly consume (as an input) external tabular data using an input table parameter (ITP). The phrase "input table parameter" refers to the query's input parameter that is used for parametrization of tabular data (which can be used instead of tables) and is used to bind tabular data at its execution time. When the input table parameter is used, a binary stream (which contains the external tabular data 86A) is transferred (at for example query execution time) to the DBMS 1220, when the input parameter indicates a table. When this is the case, the DBMS's server session layer may decode the binary stream from the external tabular data 86A and may build an internal table, such as the internal table 88C (itab, for the internal table that is internal to the working memory of the DBMS). As such, the DBMS's execution engine 123 may consume the input table parameter. In the case of a single input table parameter for a select statement, the following may be used: SELECT * FROM ? (COL1 INT, COL2 NVARCHAR(10)), which causes the external tabular data (e.g., column 1 (COL1) and column 2 (COL2) of the external tabular data to be transferred as binary stream). Unlike an SQL statement, the input table parameter may not be supported as an argument of a procedure call, so the procedure CALL MYPROC (?) may cause an error or exception when a user tries to prepare the call statement.

In some embodiments, a procedure call may accept (as input) at least one input table parameter. For example, when external tabular data is transferred via an input parameter (e.g., an input table parameter), the following procedure call may be used: "CALL MYPROC(_table_value_parameter_(?))." In this example, the external tabular data 86A (which is at an external client such as client device 1130) is transferred via the input table parameter, so the procedure consumes the decoded internal table streamed directly as an input table variable. The input table parameter (e.g., _table_value_parameter_(?)) in this example refers to variables (or placeholders) used to provide a way to insert data dynamically into the call procedure at runtime or execution of the call to the stored procedure. Moreover, multiple input table parameters may be used to point to different external tables as follows: "CALL MYPROC (_table_value_parameter_(?), _table_value_parameter_(?))."

Figure 1B:
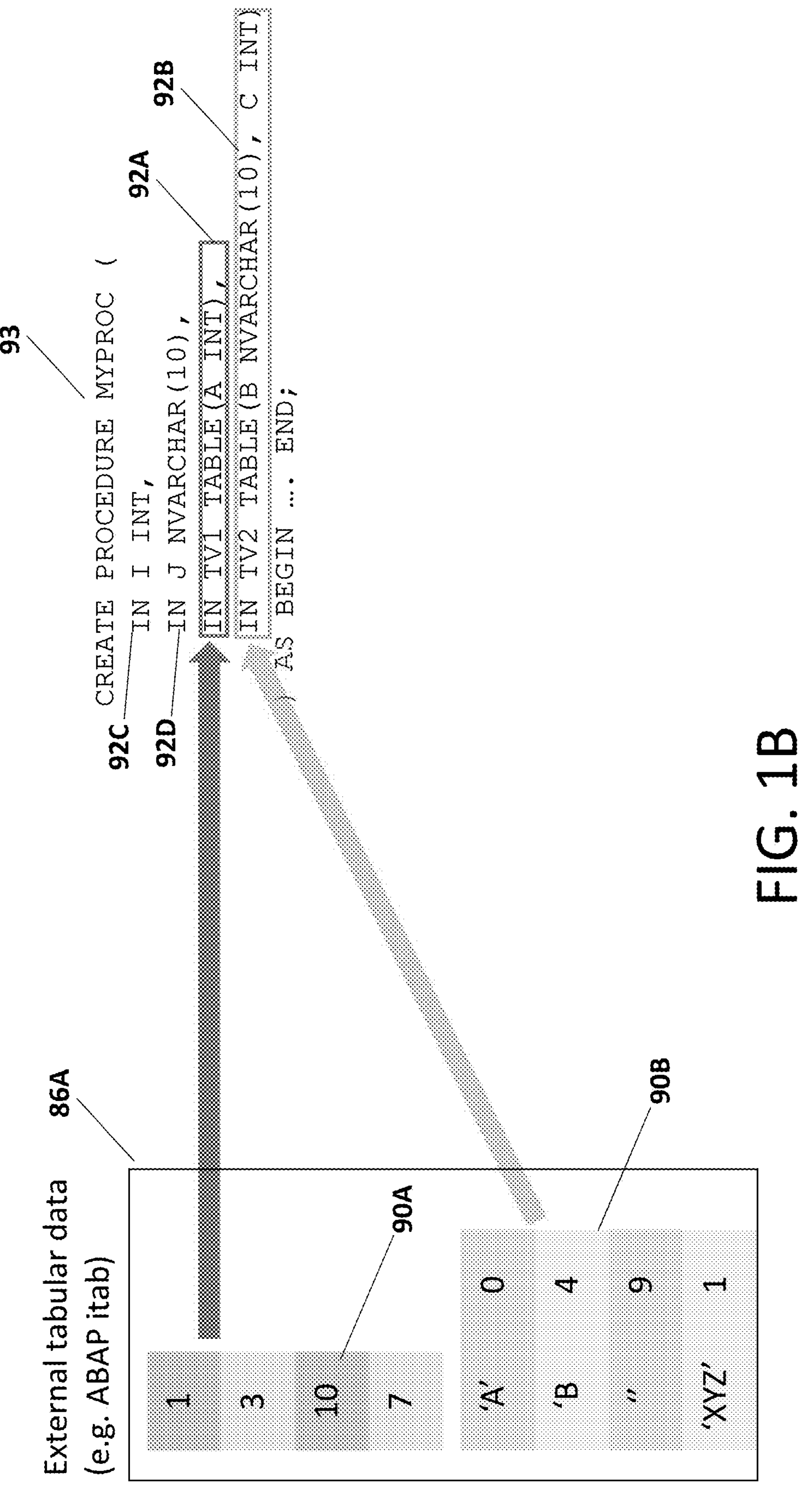
FIG. 1B depicts an example of external tabular data contained in two external tables that are directly consumed by a defined procedure call, in accordance with some embodiments.

FIG. 1B depicts an example of external tabular data 86A (e.g., an external table A 90A and an external table B 90B) which are used as input table parameters for the called stored procedure, in accordance with some embodiments. In the example of FIG. 1B, the procedure 93 (which in this example is MYPROC) includes as a first input table parameter 92A for the external table A 90A and further includes a second input table parameter 92B for the external table B 92B. In this example, the first input table parameter 92A has a type of integer (INT), and the second input table parameter 92B is defined as having two columns (wherein the first column is of type characters (NVARCHAR (10)) and the second column is of type integer (INT)). In this way, the stored procedure 93 MYPROC is created in advance, so that the procedure MYPROC can later be called at execution or runtime to enable directly consuming the external tables using the input table parameters (e.g., the first input table parameter 92A and the second input table parameter 92B). The procedure also defines input I 92C as an integer and input J 92D as NVARCHAR (10)).

Figure 1C:
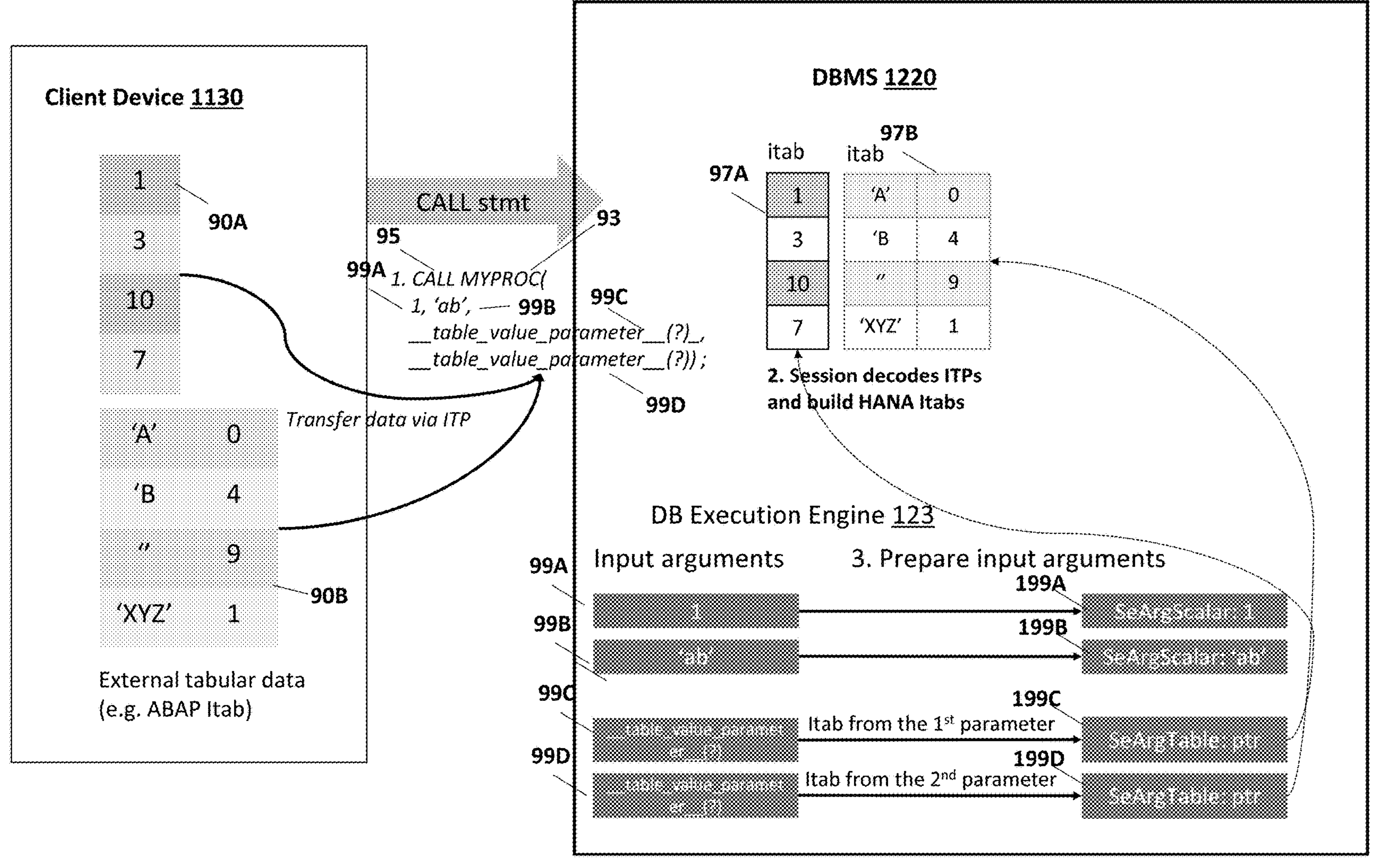
FIG. 1C depicts the client device including external tabular data used by a procedure call for directly consuming the external tabular data, in accordance with some embodiments.

FIG. 1C depicts the client device 1130 including external tabular data (e.g., the first external table 90A and the second external table 90B) that are called using CALL 95 MYPROC 93. The CALL 95 uses the stored procedure MYPROC 93, where the input table parameters 99C and 99D are given as input parameters. As such, the corresponding external tables (e.g., the first external table 90A and the second external table 90B) are transferred as a binary stream and the formatted (by the session layer) into internal table 97A and internal table 97B.

In the example of FIG. 1C, the first input table parameter "_table_value_parameter_(?)" 99C triggers the transfer of the first external table 90A into the DBMS 1220, where the DBMS's session layer decodes the input table parameter values and builds the first internal table 97A (which corresponds to the first external table 90A). Likewise, the second input table parameter "_table_value_parameter_(?)" 99D triggers the transfer of the second external table 90B into the DBMS 1220, where the DBMS's session layer decodes the input table parameter values and builds a second internal table 97B (which corresponds to the second external table 90B).

The database execution engine 123 may dynamically prepare the input arguments for the CALL. In the example of FIG. 1C, the input arguments are "1" 99A and "ab" 99B (which correspond to scalar types), the _table_value_parameter_(?) 99C (which points to the first internal table 97A), and the table_value_parameter (?) 99D (which points to the second internal table 97B). SeArg corresponds to a runtime representation of stored procedure's variables (scalar, table, and/or the like). In other words, the "_table_value_parameter (?)" 99C is wrapped with a function to specify the table-valued parameter explicitly (e.g., CALL MYPROC (_table_value_parameter_(?), _table_value_parameter_(?))). The parameter metadata for the table-valued parameter is generated as a table type that holds the column definition of the table-valued parameter. When the client device 1130 sends external tabular data as a binary data stream according to the parameter metadata (e.g., via an SQL database command), the session, as noted, decodes the binary data into one or more itabs. Moreover, the execution engine 123 keeps a map between the parameter index and the itab (e.g., internal table). The procedure CALL statement may, using the mapping, consume an itab for a parameter index.

Figure 1D:
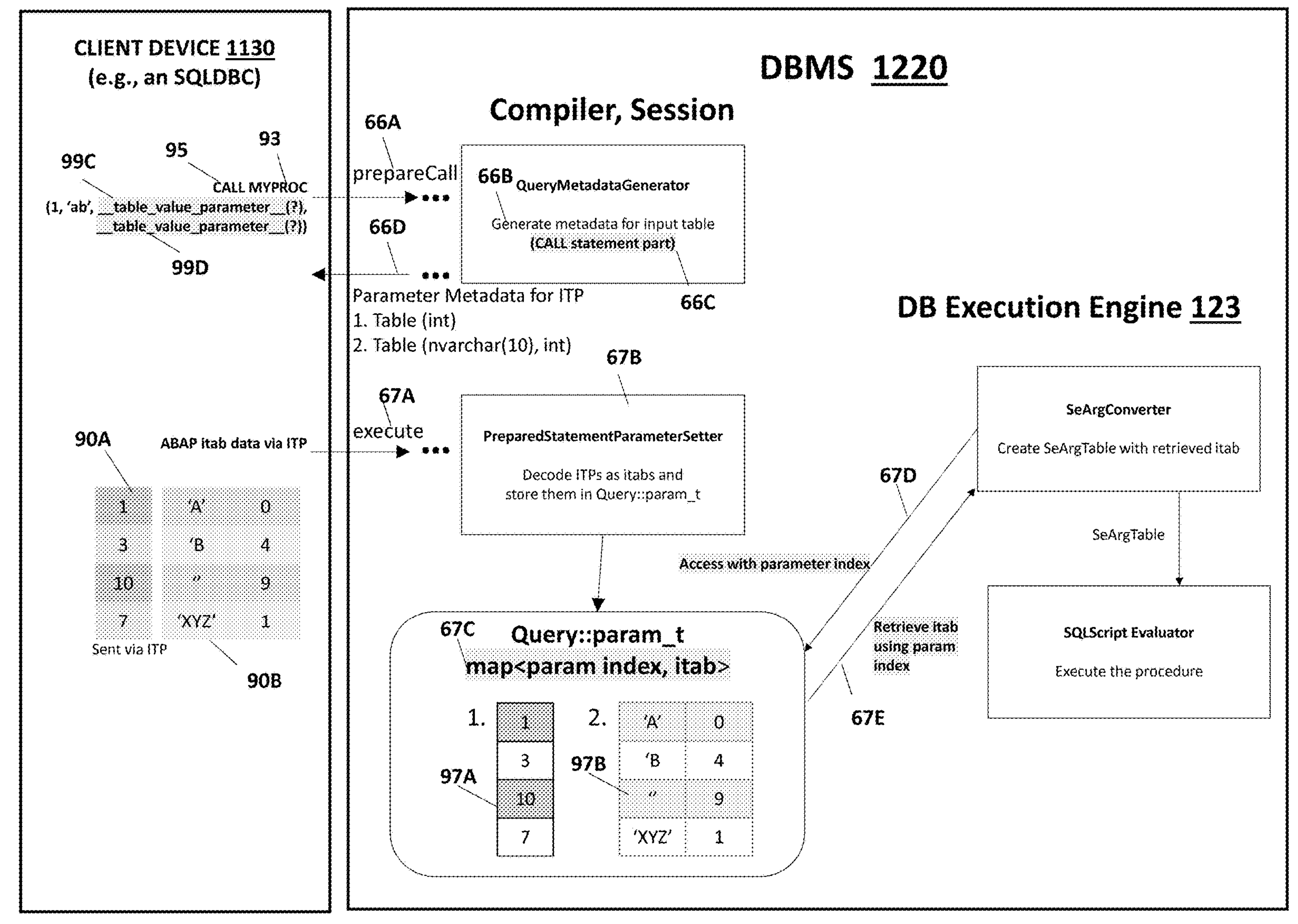
FIG. 1D depicts an example of a process for a call procedure that directly consumes external tabular data, in accordance with some embodiments.

FIG. 1D depicts an example of a process using input table parameters for call statements, in accordance with some embodiments.

At the client device 1130, the procedure CALL 95 MYPROC 93 is sent to the DBMS 1220. The CALL 95 MYPROC 93 calls a stored procedure "MYPROC" that includes input table parameters, such as the _table_value_parameter_(?) 99C and the _table_value parameter_(?) 99D. In the example of FIG. 1D, a prepareCall 66A is used to create a callable statement object at the DBMS 1220. This enables calling the stored procedure. For example, the prepareCall may cause the generation of metadata 66B for the input tables and the generation of a callable CALL statement 66C for MYPROC.

At 66D, the DBMS 1220 may return to the client device 1130 the metadata for the input table parameters. In the example of FIG. 1D, the metadata returned at 66D for the input table parameters may include the following: for the first input table parameter (e.g., the _table_value_parameter_(?) 99C) a single column of type "int"; and for the second input table parameter (e.g., the _table_value_parameter_(?) 99D) the first column is of a type variable character and the second column of type int.

During execution at 67A of the query plan for example, the database execution engine 123 may receive, based on the first input table parameter 99C and second input table parameter 99D, the external tabular data (e.g., from the first external table 90A and the second external table 90B) as a binary stream. At 67B, the database execution engine's session layer decodes the binary streams into internal tables (itabs) and stores the internal tables in memory as query parameters (e.g., "Query::param_t"). In the example, Query::param_t is a structure that holds runtime query parameter values. The Query::param_t may include a list of scalar values for scalar parameters (which are accessed by parameter index), a map of table values for table input parameters that are accessed by parameter index, and other information for the parameters. The query parameter index is mapped, at 67C, to a corresponding internal table (itab). For example, a first query parameter may be mapped to the itab 97A and a second query parameter may be mapped to the itab 97B.

During execution of the query plan, the database execution engine 123 may, at 67D, need to access an itab (internal table) in memory using a query parameter index for that internal table. For example, the database execution uses a first query parameter index to access, at 67D, the first itab 97A. This first query parameter index is used to locate the first itab using the mapping at 67C, which identifies and returns, at 67E, the first itab 97A. Likewise, the database execution uses a second query parameter index to access, at 67D, the second itab 97B.

Before providing additional description related to table valued parameters for call statements, the following provides an example of a system environment.

Figure 2:
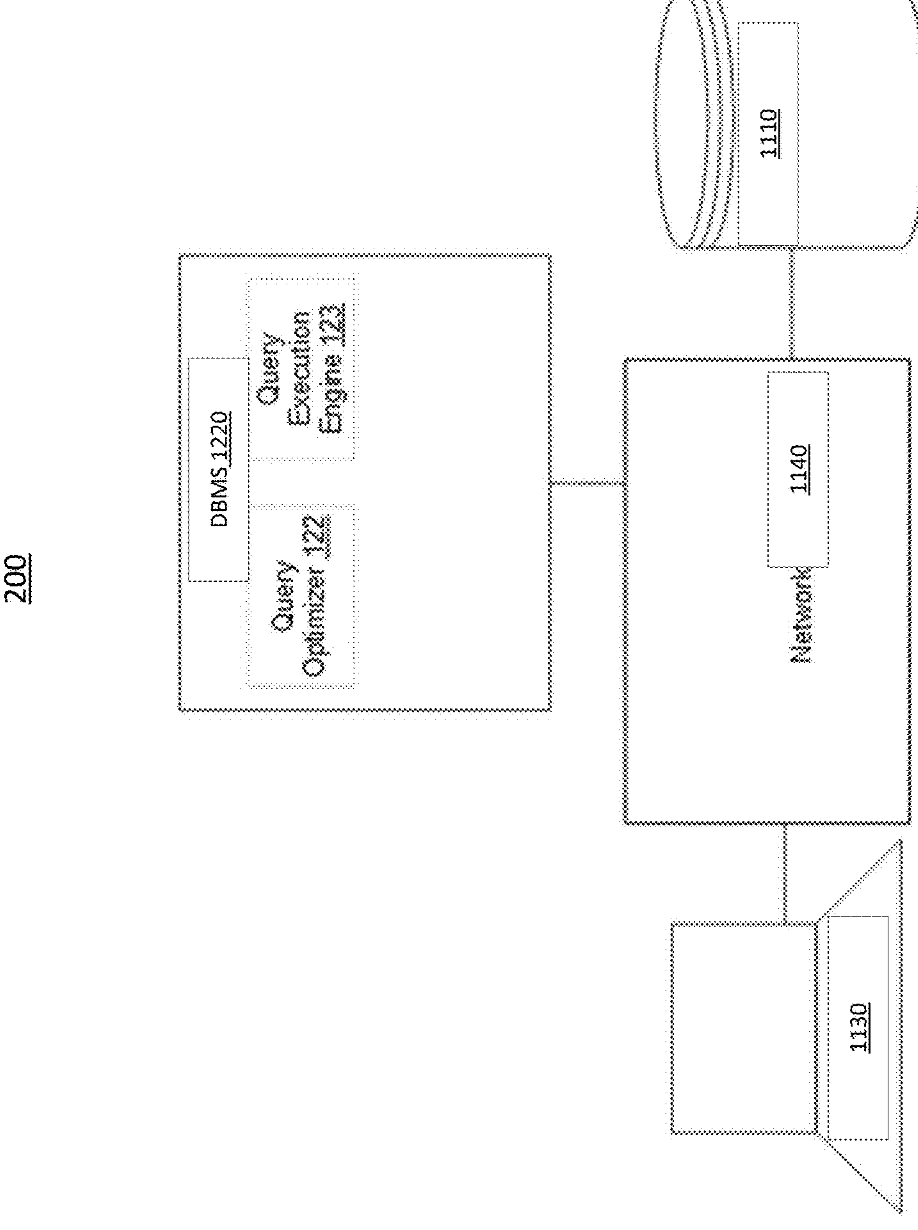
FIG. 2 depicts an example of a computing system, in accordance with some example embodiments.

FIG. 2 depicts an example of a computing system 200, in accordance with some example embodiments. Referring to FIG. 2, the computing system 200 may include a database 1110, the database management system 1220 (DBMS), and the client device 1130. For example, the database management system 1220 may include a query optimizer 122 and the database execution engine 123 (also referred to as query execution engine or execution engine), and other components or functions. It is noted that while only a single database 1110 and a single client device 1130 are shown, this is merely to avoid cluttering the figure as other quantities of client devices, databases, and the like may be implemented as well. It should be appreciated that database 1110 is representative of any number of databases 1110 (e.g., row store, column store, hybrid row/column store, etc.), and client device 1130 is representative of any number of client devices that may be included as part of computing system 200.

From an application or client device perspective, it can be extremely cumbersome to access databases such as database 1110. For example, an application may need to query different types of databases using complex queries. Consequently, the application layer in this example would need to be configured to handle the various types of databases and the various query types. Additionally, or alternatively, each database 1110 may need to process queries from the application into a format and structure that can be handled by a given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 1110 and may thus reduce the performance and response times for queries on that database layer.

In some example implementations, the database execution engine 123 (also referred to as a execution engine) may be used to decouple the higher-level, application layer from the database layer (e.g., the persistence or storage layer where data including database tables may be stored and/or queried using instructions, such as commands and/or the like). The execution engine 123 may be implemented separately from the database layer (e.g., at database 1110) and/or the application layer, although the query execution may be implemented as part of the application or database as well. Further, the execution engine 123 may be configured to receive a query, generate a query plan (including for example query algebra), optimize the query plan, and/or generate executable code, which can be executed at runtime. More specifically, the execution engine may for example receive executable code from a query compiler, apply optimization, and execute the query plan. Alternatively, or additionally, the query optimizer 122 may receive a query, generate a query plan (including for example query algebra), optimize the query plan, and/or the like. The executable code (generated by the query execution engine) may be in the form of pre-compiled code (which can be selected for certain operations in the query plan) and/or code that is generated just-in-time at query execution specifically for execution of the query plan.

The database 1110, the database management system 1220, and the client device 1130 may be communicatively coupled via a network 1140. In some example embodiments, the database 1110 may be a relational database. However, it should be appreciated that the database 1110 may be any type of database including, for example, an in-memory database, a hierarchical database, an object database, an object-relational database, and/or the like. For example, instead of and/or in addition to being a relational database, the database 1110 may be a graph database, a column store, a row store, a hybrid store (e.g., support for row and column storage of tables), a key-value store, a document store, and/or the like.

The database management system 1220 may be configured to respond to requests from one or more client devices including, for example, the client device 1130. For example, as shown in FIG. 2, the client device 1130 may communicate with the database management system 1220 via the network 1140, which may be any wired and/or wireless network including, for example, a public land mobile network (PLMN), a wide area network (WAN), a local area network (LAN), a virtual local area network (VLAN), the Internet, and/or the like. The client device 1130 may be a processor-based device including, for example, a smartphone, a tablet computer, a wearable apparatus, a virtual assistant, an Internet-of-Things (IoT) appliance, and/or the like.

FIG. 3A depicts an example process 399 for using table valued parameters for call statements, in accordance with some embodiments.

At 302, the process 399 may include receiving a call to a stored procedure that includes a first table value parameter corresponding to a first external table and a second table value parameter corresponding to a second external table. Referring to the example of FIG. 1C, the database management system 1220 may receive call 95 to a stored procedure, such as MYPROC 93. The stored procedure may include a first table value parameter, such as _table_value_parameter_(?) 99C that corresponds to the first external table 90A. Moreover, stored procedure may include a second table value parameter, such as _table_value_parameter_(?) 99D corresponding to a second external table 99D.

At 304, the process 399 may include passing, to the called stored procedure, a first bit stream of parameters from the first external table passed using the first table value parameter and a second bit stream of parameters from the second external table passed using the second table value parameter. Referring again to the example of FIG. 1C, the database management system 1220 may (during execution of the Call 95 to the stored procedure MYPROC 93) receive a first bit stream of parameters from the first external table 90A passed using the first table value parameter 99C. As noted, this first bit stream may be decoded by the session layer of the database management system and stored in an internal table, such as internal table (itab) 97A. Moreover, the database management system 1220 may (during execution of the Call 95 to the stored procedure MYPROC 93) receive a second bit stream of parameters from the second external table 90B passed using second table value parameter 99D. As noted, this second bit stream may be decoded by the session layer of the database management system and stored in an internal table, such as internal table (itab) 97B.

FIG. 3B depicts an example process 300 for using table valued parameters for call statements, in accordance with some embodiments.

At 310, the process may include receiving a prepareCall for a stored procedure that includes a first table value parameter corresponding to a first external table and a second table value parameter corresponding to a second external table. Referring to the example of FIG. 1D, the DBMS 1220 may receive, at 66A, a prepareCall for the call 95 for the stored procedure MYPROC 93.

At 320, the process may further include generating, in response to the prepareCall, metadata including metadata indicative of a first format of the first table value parameter and a second format of the second table value parameter. Referring to the example of FIG. 1D, the DBMS 1220 may, in response to the prepareCall 66A, generate metadata at 66B-C. The metadata may be returned to the client device at 66D. For example, the metadata may indicate format of the procedure parameters 92A and 92B (see, e.g., FIG. 1B) of procedure MYPROC 93, such as the metadata of the first table value parameter (which corresponds to _table_value_parameter_(?) 99C) having a single column format of type "int" and for the metadata of the second table value parameter (which corresponds to the _table_value_parameter_(?) 99D) a first column with a format of a type variable character and a second column of type int.

At 330, the process may further include receiving, based on the first table value parameter and the second table value parameter, a first bit stream and a second bit stream, wherein the first bit stream includes values from the first external table and the second bit stream includes values from the second external table. Referring to the example of FIG. 1D, the DBMS 1220 may receive, based on the _table_value_parameter_(?) 99C, a first bit stream corresponding to the first external table 90A. And, the DBMS 1220 may receive, based on the _table_value_parameter_(?) 99D, a second bit stream corresponding to the second external table 90B.

At 340, the process may further include decoding, at a session layer, the first bit stream into a first internal table and the second bit steam into a second internal table, wherein the first internal table is mapped to a first query parameter index and the second internal table is mapped to a second query parameter index. Referring to the example of FIG. 1D, the DBMS 1220 may decode (e.g., using the session layer of the database management system or database execution engine 123 and based on the metadata generated at 66B and 66C) the first and second bit streams into the first internal table 97A and the second internal table 97B. The internal tables may be stored in-memory of the DBMS 1220 (e.g., working memory of an in-memory database). Furthermore, the first internal table 97A is mapped, at 67C, to a first query parameter index (e.g., "param index, itab") and the second internal table is mapped to a second query parameter index.

At 350, the process may further include accessing, using the first query parameter index and/or the second query parameter index, the first internal table and/or the second internal table by at least using the mapping including the first query parameter index and the second query parameter index. Referring to the example of FIG. 1D, the DBMS 1220 may, during execution of a query plan, need to access, at 67D, an itab (internal table) in memory using a query parameter index for that internal table. To illustrate further for example, the database execution may use a first query parameter index to access, at 67D, the first itab 97A, such that the first query parameter index is used to locate the first itab using the mapping at 67C. Likewise, the database execution uses a second query parameter index to access, at 67D, the second itab 97B.

At 360, the process may further include retrieving, using the first query parameter index and/or the second query parameter index, the first internal table and/or the second internal table to enable use as part of query execution. Referring to the example of FIG. 1D, the DBMS 1220 may access, at 67D, the first itab 97A (using the mapping at 67C) and retrieve 67E the first itab 97A and access, at 67D, the second itab 97B (using the mapping at 67C) and retrieve 67E the second itab 97B. The retrieved internal tables 97A and 97B may be used to by the database execution engine as part of query execution.

Figure 4A:
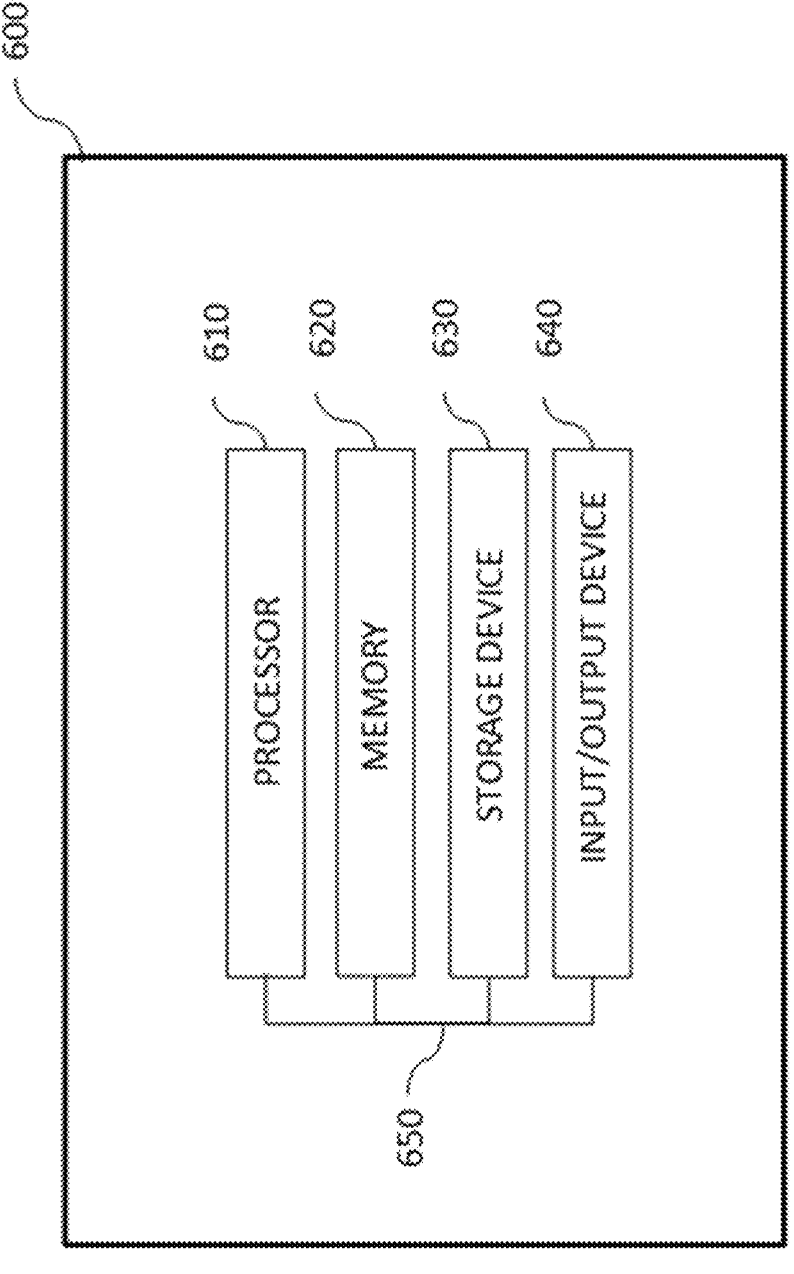
FIGS. 4A and 4B depict additional block diagrams for a system, in accordance with some example embodiments.

In some implementations, the current subject matter may be configured to be implemented in a system 600, as shown in FIG. 4A. The system may be used to provide one or more aspects disclosed herein, such as an execution engine or query optimizer or other component used to cause one or more of the operations of FIGS. 3A and/or 3B, for example. The system 600 may include a processor 610, a memory 620, a storage device 630, and an input/output device 640. Each of the components (e.g., processor 610, memory 620, storage device 630, and input/output device 640) may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 4B:
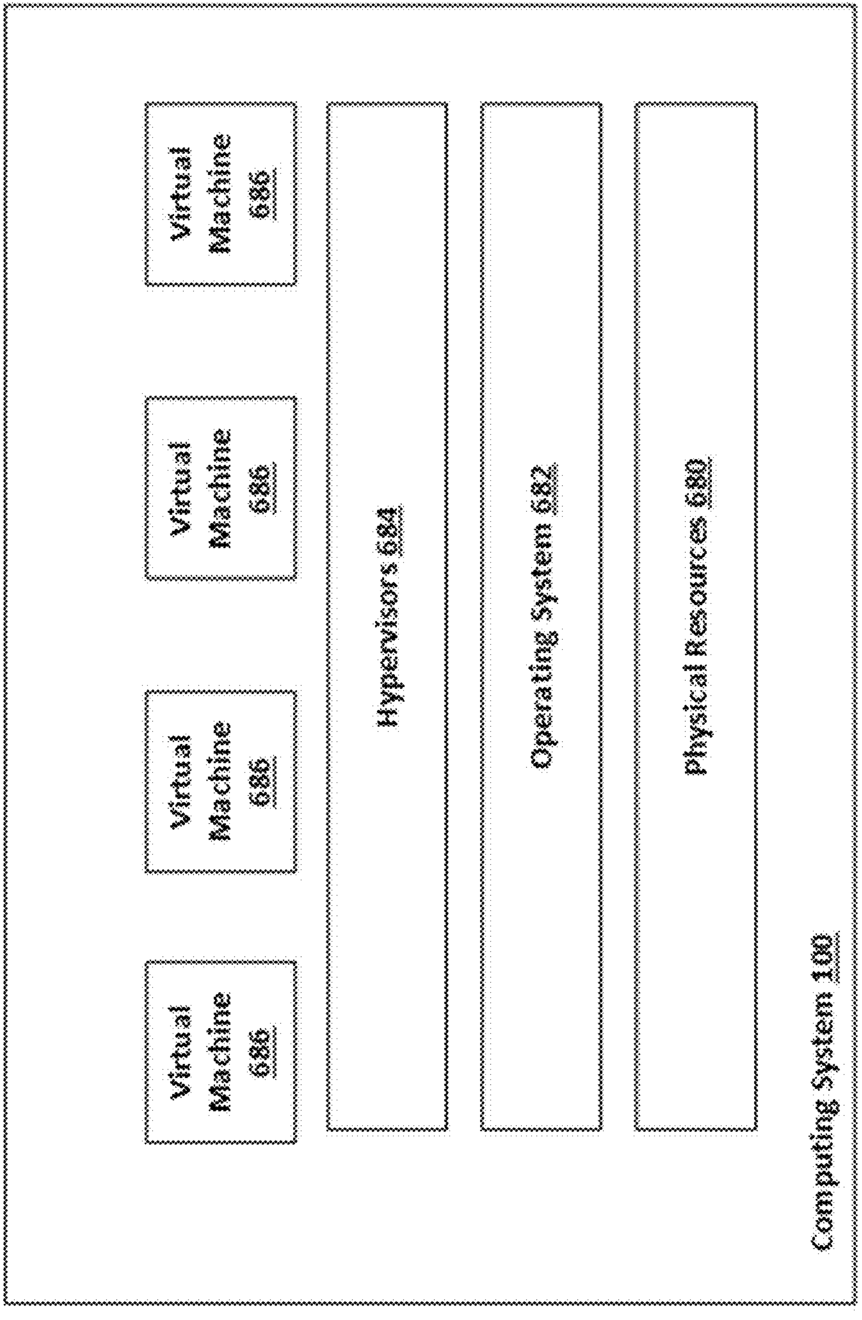

FIG. 4B depicts an example implementation of the system 600 (of FIGS. 3A and/or 3B). The system 600 may be implemented using various physical resources 880, such as at least one or more hardware servers, at least one storage, at least one memory, at least one network interface, and the like. The system 600 may also be implemented using infrastructure, as noted above, which may include at least one operating system 882 for the physical resources 880 and at least one hypervisor 884 (which may create and run at least one virtual machine 886).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising:
- receiving a call to a stored procedure that includes a first table value parameter corresponding to a first external table and a second table value parameter corresponding to a second external table; and
- passing, to the called stored procedure, a first bit stream of parameters from the first external table passed using the first table value parameter and a second bit stream of parameters from the second external table passed using the second table value parameter.

Example 2: The computer-implemented method of Example 1 further comprising:
- receiving a prepare call for the stored procedure that includes the first table value parameter corresponding to the first external table and the second table value parameter corresponding to the second external table.

Example 3: The computer-implemented method of any of Examples 1-2 further comprising:
- generating, in response to the prepare call, metadata including metadata indicative of a first format of the first table value parameter and a second format of the second table value parameter.

Example 4: The computer-implemented method of any of Examples 1-3 further comprising:
- receiving, based on the first table value parameter and the second table value parameter, the first bit stream and the second bit stream.

Example 5: The computer-implemented method of any of Examples 1-4 further comprising:
- decoding, at a session layer, the first bit stream into a first internal table and the second bit stream into a second internal table, wherein the first internal table is mapped to a first query parameter index and the second internal table is mapped to a second query parameter index.

Example 6: The computer-implemented method of any of Examples 1-5 further comprising:
- accessing, using the first query parameter index and/or the second query parameter index, the first internal table and/or the second internal table by at least using the mapping including the first query parameter index and the second query parameter index.

Example 7: The computer-implemented method of any of Examples 1-6 further comprising:
- retrieving, using the first query parameter index and/or the second query parameter index, the first internal table and/or the second internal table to enable use as part of query execution.

Example 8: A system comprising:
- at least one processor; and
- at least one memory including code which when executed by the at least one processor causes operations comprising:
  - receiving a call to a stored procedure that includes a first table value parameter corresponding to a first external table and a second table value parameter corresponding to a second external table; and
  - passing, to the called stored procedure, a first bit stream of parameters from the first external table passed using the first table value parameter and a second bit stream of parameters from the second external table passed using the second table value parameter.

Example 9: The system of Example 8 further comprising:
- receiving a prepare call for the stored procedure that includes the first table value parameter corresponding to the first external table and the second table value parameter corresponding to the second external table.

Example 10: The system of any of Examples 8-9 further comprising:
- generating, in response to the prepare call, metadata including metadata indicative of a first format of the first table value parameter and a second format of the second table value parameter.

Example 11: The system of any of Examples 8-10 further comprising:

receiving, based on the first table value parameter and the second table value parameter, the first bit stream and the second bit stream.

Example 12: The system of any of Examples 8-11 further comprising:

decoding, at a session layer, the first bit stream into a first internal table and the second bit stream into a second internal table, wherein the first internal table is mapped to a first query parameter index and the second internal table is mapped to a second query parameter index.

Example 13: The system of any of Examples 8-12 further comprising:

accessing, using the first query parameter index and/or the second query parameter index, the first internal table and/or the second internal table by at least using the mapping including the first query parameter index and the second query parameter index.

Example 14: The system of any of Examples 8-13 further comprising:

retrieving, using the first query parameter index and/or the second query parameter index, the first internal table and/or the second internal table to enable use as part of query execution.

Example 15: A non-transitory computer-readable storage medium including code which when executed by at least one processor causes operations comprising:

receiving a call to a stored procedure that includes a first table value parameter corresponding to a first external table and a second table value parameter corresponding to a second external table; and passing, to the called stored procedure, a first bit stream of parameters from the first external table passed using the first table value parameter and a second bit stream of parameters from the second external table passed using the second table value parameter.

Example 16: The non-transitory computer-readable storage medium of Example 15 further comprising:

receiving a prepare call for the stored procedure that includes the first table value parameter corresponding to the first external table and the second table value parameter corresponding to the second external table.

Example 17: The non-transitory computer-readable storage medium of any of Examples 15-16 further comprising:

generating, in response to the prepare call, metadata including metadata indicative of a first format of the first table value parameter and a second format of the second table value parameter.

Example 18: The non-transitory computer-readable storage medium of any of Examples 15-17 further comprising:

receiving, based on the first table value parameter and the second table value parameter, the first bit stream and the second bit stream.

Example 19: The non-transitory computer-readable storage medium of any of Examples 15-18 further comprising:

decoding, at a session layer, the first bit stream into a first internal table and the second bit stream into a second internal table, wherein the first internal table is mapped to a first query parameter index and the second internal table is mapped to a second query parameter index.

Example 20: The non-transitory computer-readable storage medium of any of Examples 15-19 further comprising:

accessing, using the first query parameter index and/or the second query parameter index, the first internal table and/or the second internal table by at least using the mapping including the first query parameter index and the second query parameter index.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A computer-implemented method comprising:

receiving, at a database management system (DBMS), a call to a stored procedure via a structured query language (SQL) query, the call comprising a first table value parameter corresponding to a first external table and a second table value parameter corresponding to a second external table;

receiving a prepare call for the stored procedure that includes the first table value parameter corresponding to the first external table and the second table value parameter corresponding to the second external table;

generating, in response to the prepare call, metadata including metadata indicative of a first format of the first table value parameter and a second format of the second table value parameter;

obtaining, by the DBMS and from a client device storing the first external table and the second external table, a first bit stream of parameters from the first external table using the first table value parameter and a second bit stream of parameters from the second external table using the second table value parameter;

transmitting the metadata to the client device;

decoding, at a session layer, the first bit stream into a first internal table and the second bit stream into a second internal table, wherein the first internal table is mapped to a first query parameter index and the second internal table is mapped to a second query parameter index; and passing, by the DBMS and to the called stored procedure, the first bit stream of parameters and the second bit stream of parameters for execution of the SQL query.

2. The computer-implemented method of claim 1 further comprising:

accessing, using the first query parameter index and/or the second query parameter index, the first internal table and/or the second internal table by at least using the mapping including the first query parameter index and the second query parameter index.

3. The computer-implemented method of claim 2 further comprising:

retrieving, using the first query parameter index and/or the second query parameter index, the first internal table and/or the second internal table to enable use as part of query execution.

4. A system comprising:

at least one processor; and at least one memory including code which when executed by the at least one processor causes operations comprising:

receiving, at a database management system (DBMS), a call to a stored procedure via a structured query language (SQL) query, the call comprising a first table value parameter corresponding to a first external table and a second table value parameter corresponding to a second external table;

receiving a prepare call for the stored procedure that includes the first table value parameter corresponding to the first external table and the second table value parameter corresponding to the second external table;

generating, in response to the prepare call, metadata including metadata indicative of a first format of the first table value parameter and a second format of the second table value parameter;

obtaining, by the DBMS and from a client device storing the first external table and the second external table, a first bit stream of parameters from the first external table using the first table value parameter and a second bit stream of parameters from the second external table using the second table value parameter;

transmitting the metadata to the client device;

decoding, at a session layer, the first bit stream into a first internal table and the second bit stream into a second internal table, wherein the first internal table is mapped to a first query parameter index and the second internal table is mapped to a second query parameter index; and passing, by the DBMS and to the called stored procedure, the first bit stream of parameters and the second bit stream of parameters for execution of the SQL query.

5. The system of claim 4 further comprising:

accessing, using the first query parameter index and/or the second query parameter index, the first internal table and/or the second internal table by at least using the mapping including the first query parameter index and the second query parameter index.

6. The system of claim 5 further comprising:

retrieving, using the first query parameter index and/or the second query parameter index, the first internal table and/or the second internal table to enable use as part of query execution.

7. A non-transitory computer-readable storage medium including code which when executed by at least one processor causes operations comprising:

receiving, at a database management system (DBMS), a call to a stored procedure via a structured query language (SQL) query, the call comprising a first table value parameter corresponding to a first external table and a second table value parameter corresponding to a second external table;

receiving a prepare call for the stored procedure that includes the first table value parameter corresponding to the first external table and the second table value parameter corresponding to the second external table;

generating, in response to the prepare call, metadata including metadata indicative of a first format of the first table value parameter and a second format of the second table value parameter;

obtaining, by the DBMS and from a client device storing the first external table and the second external table, a first bit stream of parameters from the first external table using the first table value parameter and a second bit stream of parameters from the second external table using the second table value parameter;

transmitting the metadata to the client device;

decoding, at a session layer, the first bit stream into a first internal table and the second bit stream into a second internal table, wherein the first internal table is mapped to a first query parameter index and the second internal table is mapped to a second query parameter index; and passing, by the DBMS and to the called stored procedure, the first bit stream of parameters and the second bit stream of parameters for execution of the SQL query.

8. The non-transitory computer-readable storage medium of claim 7 further comprising:

accessing, using the first query parameter index and/or the second query parameter index, the first internal table and/or the second internal table by at least using the mapping including the first query parameter index and the second query parameter index.

* * * * *